US010057636B1

United States Patent
Nijim et al.

(10) Patent No.: US 10,057,636 B1
(45) Date of Patent: Aug. 21, 2018

(54) AUTOMATIC VIDEO SERVICE ACTIONS BASED ON MATCHING A VIDEO CONTENT ITEM TO A CONTENT IDENTIFIER

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US); Eric S. Roberts, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/601,022

(22) Filed: Jan. 20, 2015

(51) Int. Cl.
| | |
|---|---|
| H04N 21/44 | (2011.01) |
| H04N 21/433 | (2011.01) |
| H04N 21/432 | (2011.01) |
| H04N 21/45 | (2011.01) |
| H04N 21/458 | (2011.01) |
| H04N 21/4788 | (2011.01) |
| H04N 21/4786 | (2011.01) |
| H04N 21/482 | (2011.01) |
| H04N 21/488 | (2011.01) |

(Continued)

(52) U.S. Cl.
CPC ..... *H04N 21/44008* (2013.01); *H04N 21/278* (2013.01); *H04N 21/4147* (2013.01); *H04N 21/4325* (2013.01); *H04N 21/4334* (2013.01); *H04N 21/458* (2013.01); *H04N 21/4532* (2013.01); *H04N 21/4786* (2013.01); *H04N 21/4788* (2013.01); *H04N 21/4828* (2013.01); *H04N 21/4882* (2013.01); *H04N 21/858* (2013.01)

(58) Field of Classification Search
CPC ............. H04N 21/44008; H04N 21/278
See application file for complete search history.

(56) References Cited

U.S. PATENT DOCUMENTS

| | | | |
|---|---|---|---|
| 7,895,625 B1 * | 2/2011 | Bryan | H04N 5/782 725/46 |
| 8,769,422 B2 * | 7/2014 | Russell | H04N 21/4756 715/758 |

(Continued)

OTHER PUBLICATIONS

Murphy, David, "Instapaper goes freemium, adds text-to-speech feature", Published on: Sep. 21, 2014, Available at: http://www.pcmag.com/article2/0,2817,2468926,00.asp, 4 pages.

*Primary Examiner* — Alexander Q Huerta
(74) *Attorney, Agent, or Firm* — Merchant & Gould

(57) ABSTRACT

Automatically performing an action within a video service based on an identified relationship between a content object and a video content item is provided. A content object is an electronic communication associated with a subscriber and comprises text or an image or a link to text or an image related to the video content item. A content identifier engine receives the object and parses the object against a data system storing information related to video content items. When a video content item matching or related to the object is identified, the object manager searches on demand content items and a video programming lineup available to the subscriber for the identified video content item. The video service provider performs or allocates resources to perform one or more automatic actions related to the video content item.

20 Claims, 10 Drawing Sheets

(51) Int. Cl.
  *H04N 21/858* (2011.01)
  *H04N 21/4147* (2011.01)
  *H04N 21/278* (2011.01)

(56) References Cited

U.S. PATENT DOCUMENTS

| | | | |
|---|---|---|---|
| 9,277,257 B1* | 3/2016 | Nijim | H04N 21/251 |
| 9,697,295 B1* | 7/2017 | Nijim | G06F 17/30876 |
| 2002/0059621 A1* | 5/2002 | Thomas | G06F 3/0481 |
| | | | 725/87 |
| 2003/0149988 A1* | 8/2003 | Ellis | H04N 5/44543 |
| | | | 725/87 |
| 2005/0187920 A1* | 8/2005 | Tenembaum | G06F 17/30672 |
| 2005/0204383 A1* | 9/2005 | Boulanger | H04N 5/44543 |
| | | | 725/40 |
| 2007/0233692 A1* | 10/2007 | Lisa | G06F 17/30651 |
| 2008/0097984 A1* | 4/2008 | Candelore | G06F 17/30253 |
| 2008/0098432 A1* | 4/2008 | Hardacker | H04N 7/163 |
| | | | 725/51 |
| 2009/0100016 A1* | 4/2009 | Kritt | G06F 17/30867 |
| 2010/0115559 A1* | 5/2010 | Ellis | H04N 5/44543 |
| | | | 725/53 |
| 2011/0137753 A1* | 6/2011 | Moehrle | G06Q 30/02 |
| | | | 705/27.1 |
| 2012/0274852 A1* | 11/2012 | Jung | G06F 9/4443 |
| | | | 348/564 |
| 2012/0284761 A1* | 11/2012 | Daigle | H04N 7/163 |
| | | | 725/109 |
| 2012/0311623 A1* | 12/2012 | Davis | H04N 5/765 |
| | | | 725/18 |
| 2013/0205338 A1* | 8/2013 | Sinha | G06T 1/0021 |
| | | | 725/34 |
| 2013/0242064 A1* | 9/2013 | Herdy | H04N 5/4403 |
| | | | 348/51 |
| 2014/0088952 A1* | 3/2014 | Fife | G06F 17/27 |
| | | | 704/9 |
| 2014/0164999 A1* | 6/2014 | Baird | G06F 17/30637 |
| | | | 715/810 |
| 2014/0280288 A1* | 9/2014 | Hwang | G06F 17/30637 |
| | | | 707/766 |

* cited by examiner

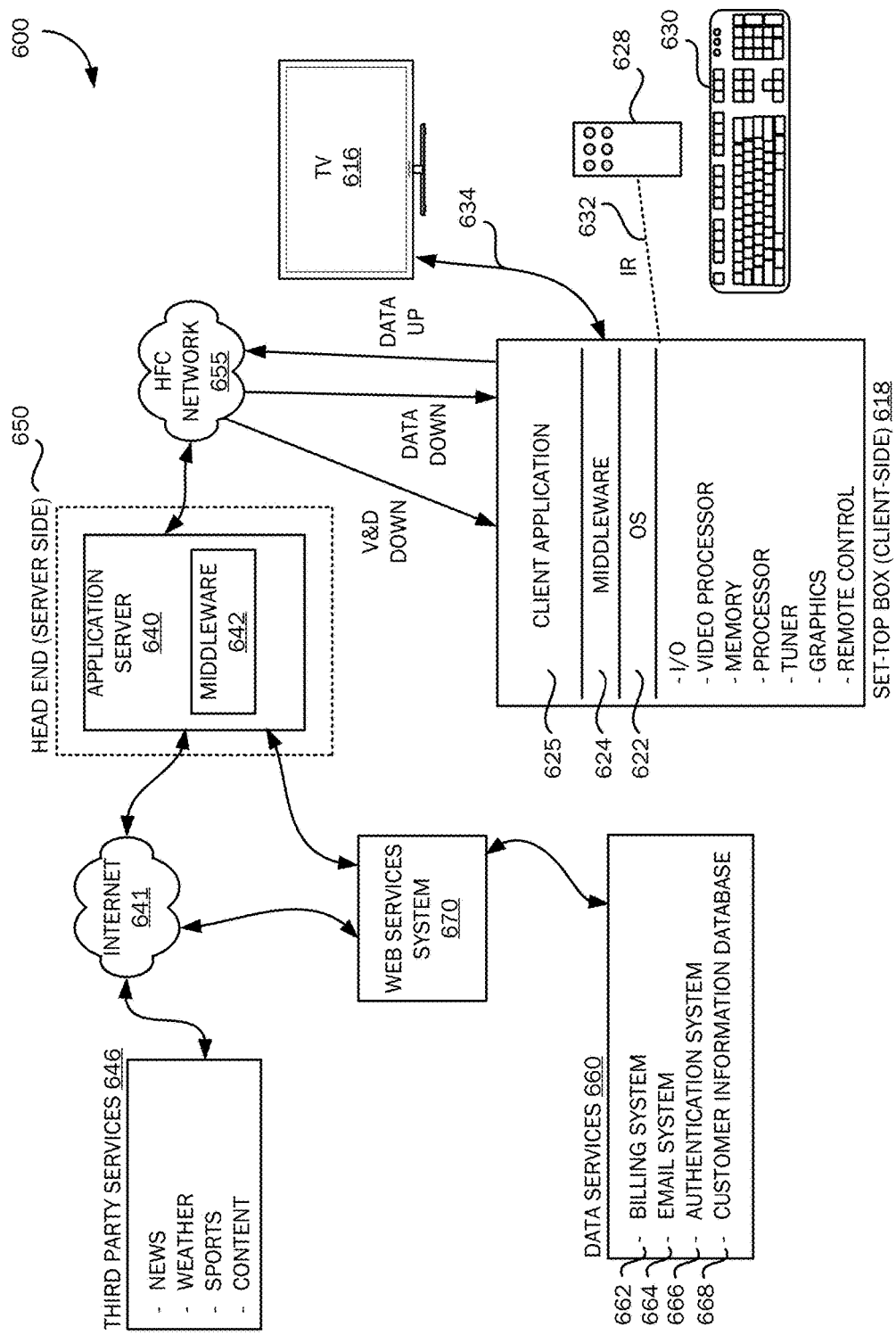

AUTOMATIC VIDEO SERVICE ACTIONS BASED ON MATCHING A VIDEO CONTENT ITEM TO A CONTENT IDENTIFIER

BACKGROUND

While browsing the Internet or reading social networking service feeds, video services users oftentimes come across information that is related to a video content item that is of interest to the user or that the user thinks would be of interest to another user. For example, a user may read an online article about a specific television show and wish to watch the television show when it airs or record the television show for later viewing. As another example, a user may watch or hear about a specific television program that he/she thinks a friend may enjoy watching. Additionally, it is common for users to communicate with others via social networking messaging, email, or other electronic messaging means about video content items that are of interest to the user or that the user thinks would be of interest to the person with whom he/she is communicating.

It is with respect to these and other considerations that aspects of the present disclosure have been made.

SUMMARY

Aspects of the present disclosure provide for automatically performing an action within a video service based on an identified relationship between a content identifier in a content object and a video content item. Aspects of a content identifier matching system allow a content identifier engine to parse a content object against an index and detect a video content item matching or related to the content object. The content identifier engine is enabled to perform one or more automatic actions related to the video content item (e.g., generate a user-selectable link to the video content item that allows a subscriber to view or record the video content item, store a copy of the video content item in a video storage medium of a video recorder accessible to the subscriber, detect and recommend similar video content, detect when the video content item is airing and tune an endpoint device to a channel airing the video content item, detect when the video content item is airing, and generate and send a notification to the subscriber when the video content item is airing/available, etc.).

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF DRAWINGS

Further features, aspects, and advantages of the present disclosure will become better understood by reference to the following figures, wherein elements are not to scale so as to more clearly show the details and wherein like reference numbers indicate like elements throughout the several views:

FIG. 2A is an illustration of an example user interface (UI) components displayed in a toolbar of a browser application UI and in an example webpage;

FIG. 2B is an illustration of a user selecting a portion of text in an example webpage and selecting a content object UI component to send the selected text to the content identifier matching system;

FIG. 6 is a simplified block diagram illustrating a cable television services system architecture operating environment with which aspects may be practiced.

DETAILED DESCRIPTION

A content identifier matching system and accompanying method are described herein and are illustrated in the accompanying figures. The system allows a content identifier engine to perform one or more automatic actions related to a video content item based on an identified relationship between a content object and the video content item.

Figure 1:
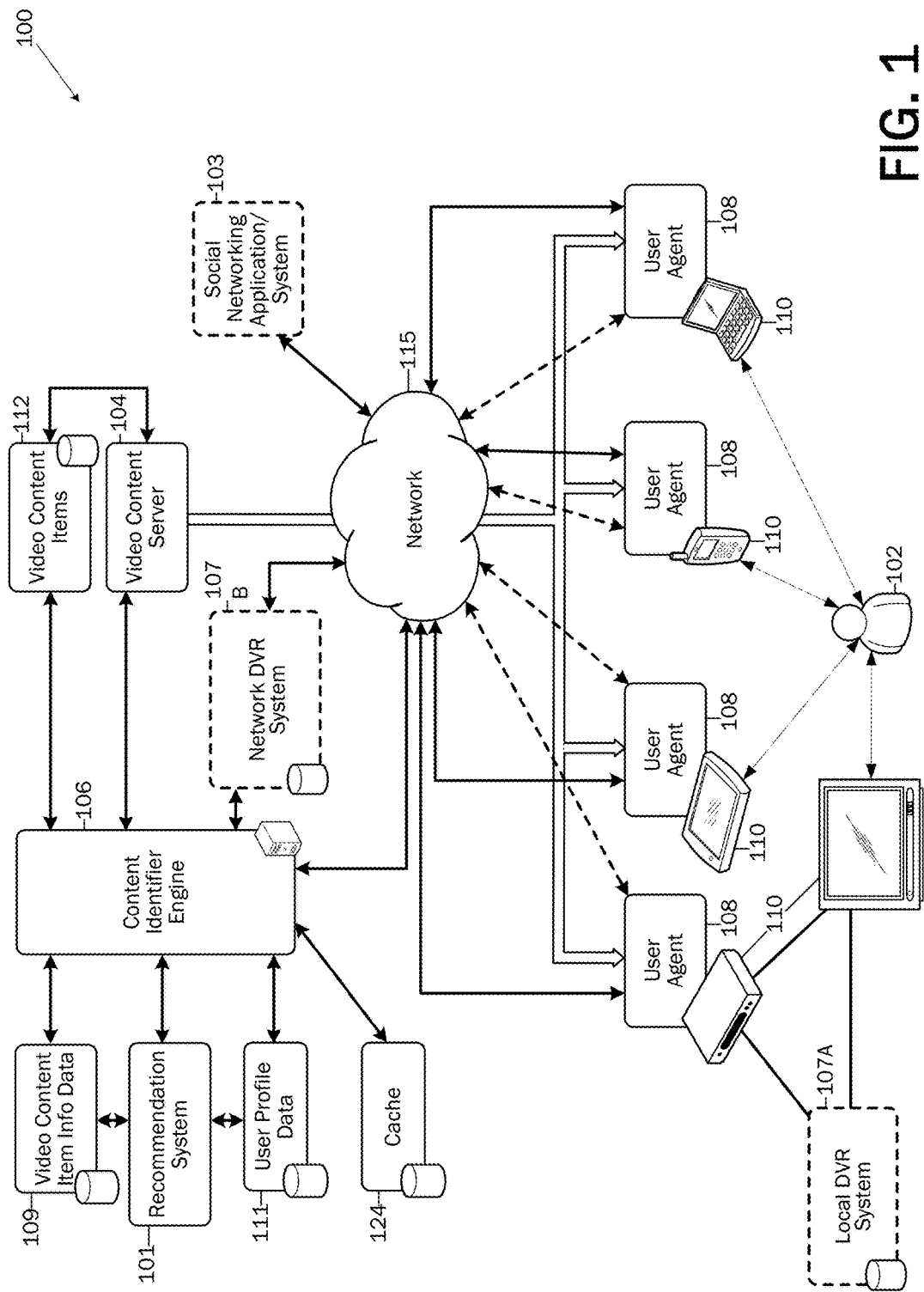
FIG. 1 is a simplified block diagram illustrating one example of a content identifier matching system.

FIG. 1 is a simplified block diagram of one example of a content identifier matching system 100. The content identifier matching system 100 allows a content identifier engine 106 to automatically perform one or more automatic actions related to a video content item based on an identified relationship between a content object and the video content item. For example, the content identifier engine 106 is operable to generate a user-selectable link to the video content item that allows a subscriber to view or record the video content item, store a copy of the video content item in a video storage medium of a video recorder accessible to the subscriber, detect and recommend similar video content, detect when the video content item is airing and tune an endpoint device to a channel airing the video content item, detect when the video content item is airing, and generate and send a notification to the subscriber when the video content item is airing/available, etc.

According to an aspect, components of the content identifier matching system 100 operate as a distributed system, where each component is accessed via a suitable network. According to another aspect, various components of the system operate together as an integrated system. As illustrated, the content identifier matching system 100 includes a content identifier engine 106 in communication with a video content server 104. According to an aspect, the content identifier engine 106 is integrated with a video service provider system. Examples of video service providers include providers of video programming, such as, but not limited to, multiple system operators, cable television (CATV) services system operators, direct-to-home (DTH) or direct broadcast satellite (DBS) operators (i.e., satellite system operators), terrestrial (i.e., over-the-air) broadcast system operators (e.g., networks and stations), Internet protocol television (IPTV) system operators, Internet television system operators, and Internet service providers.

The video content server 104 streams video content items to customer endpoint devices 110 over a network 115. Networks suitable for use with the content identifier matching system 100 include, but are not limited to, one or more of a television service provider content delivery network, the Internet, a wide area network, and a local area network. Examples of suitable endpoint devices 110 include, but are not limited to, digital set-top boxes (STBs), personal computers, tablet computing devices, smart phones, smart televisions, digital media players, and game consoles. A user agent 108 running on the endpoint device 110 receives the content stream and renders the video content item on a display associated with the endpoint device 110.

Video content items include live or pre-recorded programs streamed as linear programming (e.g., the program lineup on a particular channel). Video content items also encompass non-linear programming from a video on-demand system. The content identifier engine 106 is in communication with one or more data systems, such as, but not limited to, a video content item data system 112, a user profile data system 111, a video content item information data system 109, a recommendation system 101, and a DVR system 107A,B. According to an aspect, programming lineups and a listing of available video on-demand content items stored in a video content item system 112 are communicated with the video content server 104 and the content identifier engine 106.

According to an aspect, the content identifier engine 106 is operable to receive a content object from a social networking service 103 or via an electronic communication application, and parse the content object against an index for identifying a video content item matching or related to the content object. According to an aspect, the electronic communication application is a user agent 108 running on an endpoint device 110, The content identifier engine 106 is further operable to perform or schedule actions to be performed as specified by the subscriber 102, for example, generate a user-selectable link to the video content item that allows a subscriber to view or record the video content item, store a copy of the video content item in a video storage medium of a video recorder accessible to the subscriber, detect and recommend similar video content, detect when the video content item is airing and tune an endpoint device to a channel airing the video content item, detect when the video content item is airing, and generate and send a notification to the subscriber when the video content item is airing/available, etc.

According to an aspect, a video service subscriber 102 selectively associates his/her video service subscriber account with a social networking service 103 account such that social networking service messages (or posts) posted to the social networking service 103 account are communicated to the content identifier engine 106. For example, the subscriber 102 is enabled to create a dedicated social networking service 103 account for receiving social networking service messages (i.e., a content object) comprising a content identifier matching or related to a video content item. According to an aspect, the social networking service messages are shared with the video service provider, for example, via an application programming interface (API) for retrieving social networking service messages or via linking the social networking service 103 account with the video service subscriber account through the social networking service 103, the video service, or through a third party application. According to an aspect, the social networking service messages are received by the content identifier engine 106. According to another aspect, the social networking service message is received by the user agent 108, which sends the social networking service message to the content identifier engine 106.

As another example, the subscriber 102 is enabled to give the video service provider permission to access the subscriber's sent and/or received social networking service messages (i.e., content objects) for identifying a content identifier within the messages matching or related to a video content item. According to an aspect, social networking service 103 messages associated with a subscriber 102 are received by the content identifier engine 106. The social networking service messages are shared with the video service provider, for example, via an application programming interface (API) for retrieving social networking service messages or via linking the social networking service 103 account with the video service subscriber account through the social networking service 103, the video service, or through a third party application.

According to an aspect, the content identifier engine 106 is operable to make a request for content items associated with a specific subscriber 102. For example, the content identifier engine 106 makes a request to a social networking service for messages sent by the subscriber 102 and/or messages sent to the subscriber 102, or to a social networking service account created by the subscriber 102 for receiving messages comprising content identifiers matching or related to video content items. According to an aspect, a request is an active request (e.g., a pull). According to another aspect, the content identifier engine 106 requests to receive updates when messages are received and/or sent (e.g., a push).

According to another aspect, an extension is installed on the subscriber's endpoint device 110 as a plug-in or add-on to a browser application (e.g., user agent 108) or that is embedded in the browser application. The extension provides a selectable content object UI component within a toolbar of the browser application or in a contextual user interface menu, which when selected, sends a message comprising a link to the webpage or comprising the content or a portion of the content of the webpage displayed in the browser application to the content identifier engine 106 for identifying a content identifier within the webpage matching or related to a video content item. According to an aspect, the subscriber 102 is prompted to log in such that a cookie with an identifier associated with the subscriber can be passed with the message to the content identifier engine 106.

According to another aspect, a selectable content object UI component is added to a webpage, for example, by the webpage's publisher, which when selected, sends a message (i.e., content object) comprising a link to the webpage or comprising the content or a portion of the content of the webpage displayed in the browser application to the content identifier engine 106 for identifying a content identifier within the webpage matching or related to a video content item. According to an aspect, the user selecting the content object UI component is prompted to log in with his/her video service subscriber credentials if the user is a subscriber 102, or is prompted to enter an identifier of a subscriber 102 with whom the user would like to share the link to the webpage or the content of the webpage displayed in the user's browser application. For example, a cookie with an identifier associated with the subscriber 102 can be passed with the message to the content identifier engine 106.

According to another aspect, a content object, such as a text message, an email, an instant message, or other type of electronic communication, includes a specific identifier as a recipient of the object, wherein the specific identifier is an address of a mailbox or message inbox associated with a specific video service subscriber 102. For example, the subscriber 102 or another user with whom the subscriber 102 has shared his/her identifier, may send a message comprising content or a link to a webpage including the identifier as a recipient of the message. According to an aspect, the content identifier engine 106 is enabled to retrieve messages from the mailbox or message inbox on behalf of the specific video service subscriber 102 for identifying content identifiers within the content object matching or related to a video content item.

According to another aspect, an extension is installed on the user's endpoint device 110 as a plug-in or add-on to a text messaging, an emailing, an instant messaging, or other type of electronic communication application. The extension provides a selectable content object UI component within a toolbar of the application, within a toolbar of a message, or in a contextual user interface, which when selected, sends a copy of a message or a selected portion of the message to the content identifier engine 106 for identifying a content identifier within the webpage matching or related to a video content item.

According to an aspect, a user agent 108 (e.g., a television service provider guide, viewer application, browser application, etc.) running on the endpoint device 110 or on the network 115 provides a user interface for receiving user input including user preferences for automatic actions that a subscriber 102 would like for the content identifier engine 106 to take upon identifying a content identifier within a content object matching or related to a video content item. For example, the subscriber 102 is enabled to specify user preferences related to the content identifier engine 106 performing one or more of the following actions when a match or a relationship is identified between a received content object and a video content item: generate a user-selectable link to the video content item that allows a subscriber to view or record the video content item, store a copy of the video content item in a video storage medium of a video recorder accessible to the subscriber, detect and recommend similar video content, detect when the video content item is airing and tune an endpoint device to a channel airing the video content item, detect when the video content item is airing, and generate and send a notification to the subscriber when the video content item is airing/available, etc.

According to an aspect, additional information from the subscriber 102 is received, for example, permission for the content identifier engine 106 to access the subscriber's social networking service messages, a mobile phone number or email address for receiving a notification when the specific social video content item is airing, etc. According to an aspect, the subscriber 102 is enabled to specify one or more users as authorized senders of content objects to the subscriber. For example, the subscriber 102 may enter contact information (e.g., an email address, a phone number, a social networking service identifier, instant messaging service connection information (e.g., an Internet protocol (IP) address and port number), etc.) of a user. Accordingly, messages from the user are received by the content identifier engine 106 for the subscriber 102. As another example, the subscriber 102 is prompted to accept/reject a content object from a particular user.

Social networking service identifiers, action preferences selected by the subscriber 102 (or default actions if the subscriber 102 has not specified his/her preferences), and additional user input (e.g., permissions, mobile phone numbers, email addresses, etc.) are communicated to the content identifier engine 106 and stored in the user profile data system 111. According to an aspect, additional video service account information for the subscriber 102 is stored in the user profile data system 111 such as endpoint device identifiers (e.g., user's STB media access control (MAC) address, user's DVR MAC address, etc.), the video content lineup and on-demand content available to the subscriber (e.g., based on region, subscription, etc.), user entitlements, and user restrictions (e.g., parental controls). According to an aspect, the user profile data system 111 stores information associated with the subscriber's viewing history, demographic information, and video content preferences.

The video content item information data system 109 stores information related to the video content items, for example, titles, actors, directors, production crew, characters, plot summaries, quotes, soundtrack songs, and other keywords. According to an aspect, the video content item information data system 109 stores visual information related to video content items, for example, of video content poster art images, images of video content retail packaging, images from scenes of video content items, images of actors, characters, etc.

According to an aspect, the video content item information data system 109 is in communication with the recommendation system 101. In various aspects, the recommendation system 101 is in communication with the user profile data system 111, and is operable to select recommended video content items based on information known about the subscriber 102, such as the subscriber's viewing history, demographic information about the subscriber, the subscriber's video content preferences, and the subscriber's entitlements and restrictions.

According to an aspect, the content identifier engine 106 is operable to parse a received content object (e.g., a text message, an email, an instant message, or other type of electronic communication) or content within an object accessed via a link included in a received content object for one or more content identifiers. Examples of content identifiers include, without limitation, textual identifiers (e.g., machine readable text) and visual identifiers (e.g., machine readable images, QR codes, etc.). The content identifier engine 106 is further operable to match the content identifier against contents of the video content item information data system 109. For example, the received content object may be a text message including a title of a television program. As another example, the content object may be a message including a link to a webpage about a movie. The content identifier engine 106 is operable to read the text or image in the message or the webpage, and parse the text or image against the contents of the video content item information data system 109 for finding a match or relationship between the text, a portion of the text, or an image in the message or webpage and one or more of an actor, director, production crew, character, plot summary, quote, soundtrack song, keyword, an image of poster art, image of retail packaging, image from a scene, image of an actor, image of a character, etc., associated with a video content item.

According to an aspect, the content identifier engine 106 uses natural language processing to read text and to provide context for finding a matching or related video content item. For example, if a content object including the text, "the new Bob Smith show is coming on tonight" is received, the word "tonight" may be used to search for a video content item airing the day the content object is received.

According to an aspect, the content identifier engine 106 is operable to reference the user profile data system 111 for identifying which video content lineup and video on-demand video content are available to the subscriber 102. The content identifier engine 106 is further operable to retrieve the video service provider's video content programming lineup and video on-demand list for the subscriber (stored in the video content item data system 112), and search the programming lineup and video on-demand list for the video content item matching or related to the received content object. If the video content item is found, the content identifier engine 106 queries the user profile data system 111 for identifying action preferences selected by the subscriber 102 (or default actions if the subscriber 102 has not specified his/her preferences). According to an aspect, if the video content item is programming that requires payment, the subscriber 102 is prompted to purchase the item prior to performing an automatic action.

According to an aspect, the content identifier engine 106 comprises or is in communication with one or more controllers operable to allocate resources to complete a request and/or to direct the DVR system 107A,B, the video content server 104, the recommendation system 101, or other system regarding what action to take according to action preferences selected by the subscriber 102 (or default actions if the subscriber 102 has not specified his/her preferences).

For example, if the subscriber 102 makes a selection specifying for the content identifier engine 106 to automatically record video content items matching or related to a received content item, upon identifying a match or relationship between a received content item and a video content item, the content identifier engine 106 store a copy of the video content item in a video storage medium of a DVR system 107A,B accessible to the subscriber when the video content item is available. According to an aspect, the DVR system 107 is a network DVR system 107B, where recorded content is stored in a network-based video storage medium and accessible via various endpoint devices 110. According to another aspect, the DVR system 107 is a local DVR system 107A, where recorded content is stored in a locally-based video storage medium and accessible to a local endpoint device 110. According to another aspect, the DVR system 107 is a combination of a network and local DVR system (e.g., a network-based scheduling system for a locally-based DVR system). According to an aspect, a local DVR system 107A is connected to or integrated with a set-top box (STB) in communication with a television set.

As another example, if the subscriber 102 wants to receive recommendations for video content similar to a video content item matching or related to a content identifier in a received content object, the content identifier engine 106 communicates a request to the recommendation system 101 for video content items related to the video content item. The recommendation system 101 is operable to compare metadata on the video content item matching or related to the received content identifier in the content object with metadata on other available video content items, and recommend one or more video content items to the user according to a similarity (e.g., topic, actors, producer, genre, etc.) to the video content item and according to the subscriber's viewing history, demographic information, video content preferences, entitlements, restrictions, and the like. The recommendations determined by the recommendation system 101 are provided to the content identifier engine 106. The content identifier engine 106 is operable to provide the recommendations to the subscriber 102 via the user agent 108.

According to an aspect, the recommendation system 101 is called by the content identifier engine 106 to help narrow down search results of matching or related video content items. For example, if a content object comprising the text, "you need to check out the new train show" is received, the content identifier engine 106 may find numerous search results of video content items matching or related to the content identifiers in the content object. The content identifier engine 106 is operable to call the recommendation system 101 to determine which search results are likely candidates for the subscriber 102. For example, the recommendation system 101 utilizes information known about the subscriber 102 to determine that the subscriber 102 is an adult and watches a lot of documentaries. Accordingly, the recommendation system 101 culls out programs that are children's programming.

According to an aspect, the content identifier matching system 100 includes a cache 124 operable to store various types of information. For example, for a given session, data relating to a user's preferences, message, or consumption patterns may be temporarily stored in the cache 124 for use by the content identifier engine 106 before the data is stored in the user profile data system 111, the mailbox or message inbox, or the recommendation system 101. The cache 124 is illustrated in FIG. 1 as a remote element, but according to an aspect, is integrated with the content identifier engine 106.

According to an aspect, the content identifier engine 106 is a software application having sufficient computer executable instructions for performing the functions described herein. According to an aspect, the content identifier engine 106 operates as part of a video content service provider system. According to another aspect, the content identifier engine 106 operates as a standalone application or service that is called on for providing the functionality described herein.

Figure 2A:
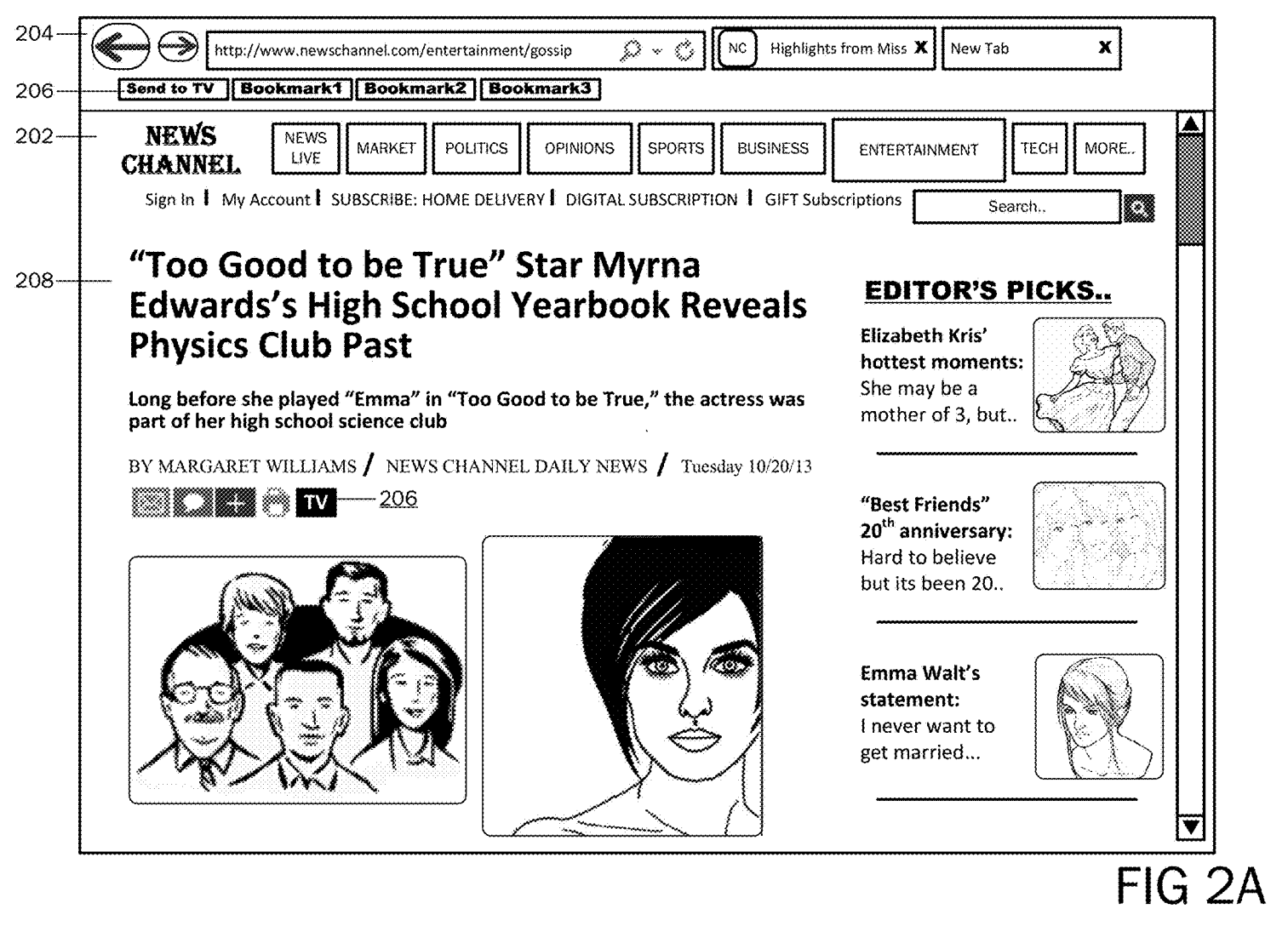

As described above, the content identifier matching system 100 is enabled to receive a content object via various methods. According to an aspect, a selectable content object UI component is provided within a toolbar of a browser application or within a webpage. FIG. 2A shows an example webpage 202 displayed in a browser application user interface (UI) 204. A selectable content object UI component 206 is shown displayed in the toolbar of the browser application UI 204. Another selectable content object UI component 206 is shown displayed in the example webpage 202. A selection of one of the selectable content object UI components 206 sends a content object comprising a link of the webpage 202 or text from the webpage 202 to the content identifier engine 106. According to an aspect, the content object is sent to the user agent 108, which then sends the content object to the content identifier engine 106.

Consider, for example, that a user views an online article 208. In the example illustrated in FIG. 2A, the title of the online article is "Too Good to be True' Star Myrna Edwards's High School Yearbook Reveals Physics Club Past." Consider that the user selects one of the displayed selectable content object UI components 206. According to an aspect, after selecting the content object UI component, the user is prompted to sign in or log in with his/her video service provider credentials. If the user is a subscriber 102 and logs into his/her account, selection of the content object UI component 206 causes a content object to be sent to the content identifier engine 106 and be associated with the subscriber's account. That is, the subscriber 102 is enabled to selectively send the article 208 to himself/herself so that a video content item matching or related to a content identifier in the article 208 is automatically scheduled for recording, added to a folder, or other action according to the subscriber's preferences.

According to another aspect, the user may be prompted to select or enter an identifier of a subscriber 102 with whom the user would like to share the article 208. For example, the user may or may not be a subscriber of services with the video service provider, but may be a friend or family member of a subscriber 102 with whom the user would like to share the article 208. Alternatively, the user may be a subscriber 102 wanting to share the article 208 with another subscriber. Accordingly, the user is enabled to select or enter an identifier of the subscriber 102. According to an aspect, a subscriber 102 is enabled to share a content object with another subscriber 102 within a same household account. According to an aspect, when the subscriber 102 logs in, he/she is provided with a list of subscribers in the household from which he/she may select the subscriber with whom he/she wants to share the content object.

Continuing with the example illustrated in FIG. 2A, according to an aspect, the content object sent to the content identifier engine 106 includes text from the article. According to another aspect, the content object sent to the content identifier engine 106 includes a link to the article 208. The content identifier engine 106 is operable to parse the content in or linked to the content object for content identifiers to match against the contents of the video content item information data system 109. For example, various keywords may be parsed from the article 208 and matched with information related to one or more video content items. The keywords may be matched against video content item titles, actors, directors, production crew, characters, plot summaries, quotes, soundtrack songs, and other keywords.

As described above, according to an aspect, the content identifier engine 106 communicates with the user profile data system 111 and uses the subscriber's user profile data for determining which content the subscriber 102 is entitled to access. The content identifier engine 106 is operable to filter out results that are not available to the subscriber 102 due to parental restrictions, content permissions, recommendation engine settings, etc. For example, if there are parental restrictions on the subscriber's account and the video content item is restricted content, the content identifier engine 106 does not perform an action related to the video content item. According to an aspect, the content identifier engine 106 generates and sends a notification to the subscriber 102 informing him/her that the content is restricted to him/her.

When the content identifier engine 106 identifies a video content item as a match, for example in this case if a video content item titled, "Too Good to be True," exists and the subscriber 102 is permitted to and is entitled to watch the content, the content identifier engine 106 performs another search to find availability options for the identified video content item. According to an aspect, the content identifier engine 106 generates and sends a notification to the requesting user and/or the subscriber 102 with availability details related to the video content item.

According to an aspect, the content identifier engine 106 communicates with the user profile data system 111 to identify endpoint device information for performing an action related to the video content item. According to an aspect, the content identifier engine 106 is operable to allocate resources to complete a request and/or to direct the DVR system 107A,B, the video content server 104, the recommendation system 101, or other system about actions to take according to action preferences selected by the subscriber 102 (or default actions if the subscriber 102 has not specified his/her preferences). For example, content identifier engine 106 is operable to generate a collection of user-selectable links that would allow a subscriber to view or record the video content item. As another example, the content identifier engine 106 is operable to automatically store a copy of the video content item in a video storage medium of the subscriber's DVR system 107. As another example, the content identifier engine 106 is operable to generate and send a notification to the subscriber 102, information the subscriber that the video content item is available or airing. As another example, the content identifier engine 106 is operable to request for recommended content related to the video content item and generate a collection of user-selectable links that would allow a subscriber to view or record the recommended video content items, etc.

According to an aspect, the subscriber 102 is enabled to accept or decline a content object sent from a specific user. For example, an acquaintance of the subscriber 102 may send the subscriber 102 a message about a television program in which the subscriber 102 is not interested. Accordingly, the subscriber 102 may select to delete the content object and/or to block receiving messages from the specific user. According to an aspect, the subscriber 102 is prompted to accept or decline performance of an action related to the video content item. For example, the content identifier engine 106 generates a collection of user-selectable links that would allow a subscriber to view or record video content items matching or related to received content objects. The content identifier engine 106 is further operable to receive a selection from the subscriber 102 regarding which user-selectable links that the subscriber would like keep or delete, which video content items the subscriber 102 would like to be recorded or to be automatically tuned to when they air or are available, which video content items to send a notification to the subscriber 102 about when they air or are available, etc. The tent identifier engine 106 is further operable to generate and provide a user interface that would allow the subscriber 102 to edit action preferences for the video content item. For example, the subscriber 102 may indicate that he/she wants to record a single episode of a series rather than to record the series or vice versa.

Figure 2B:
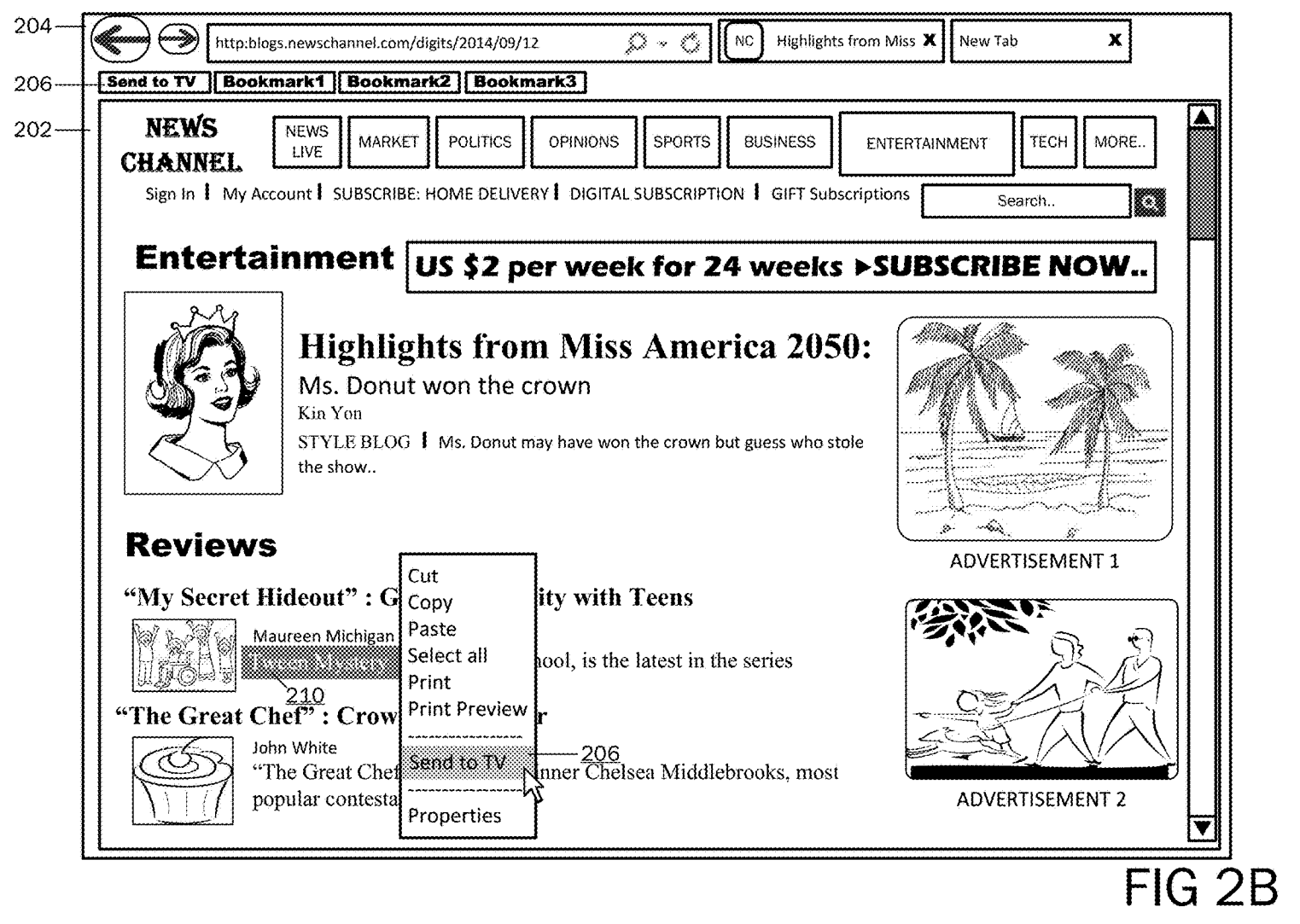

According to an aspect, a user may be enabled to select a portion of text from content to send in a content object to the content identifier engine 106. For example and as illustrated in FIG. 2B, a user may highlight a portion of text 210 and subsequently select a content object UI component 206 to send the selected text 210 to the content matching system 100. According to an aspect, a contextual menu user-interface with a content object UI component 206 is displayed when a portion of text is highlighted.

Figure 2C:
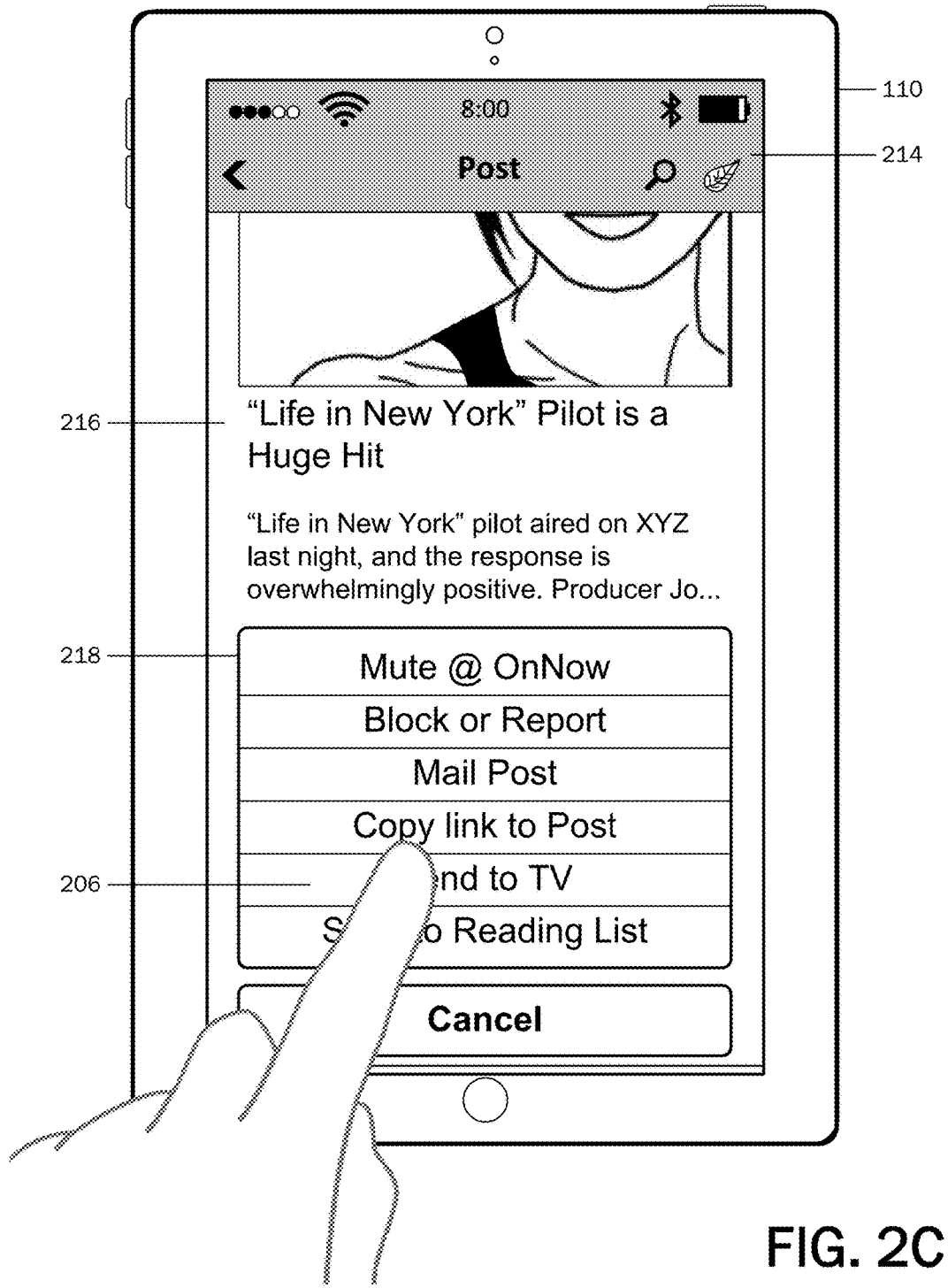
FIG. 2C is an illustration of an example content object UI component integrated with a social networking service application.

As described above, according to an aspect, a selectable content object UI component 206 is provided by an extension that is installed on the subscriber's endpoint device 110 as a plug-in or add-on to a text messaging, an emailing, an instant messaging, a social networking, or other type of electronic communication application. With reference to FIG. 2C, consider for example that a subscriber 102 views a social networking message or post 216 using a social networking service application 214, wherein the social networking message or post 216 comprises content related to a video content item that the subscriber 102 would like to view. The subscriber 102 selects to bring up a menu 218 comprising the content object UI component 206, and then select the content object UI component 206 to send the message or post 216 to the content identifier matching system 100.

Figure 2D:
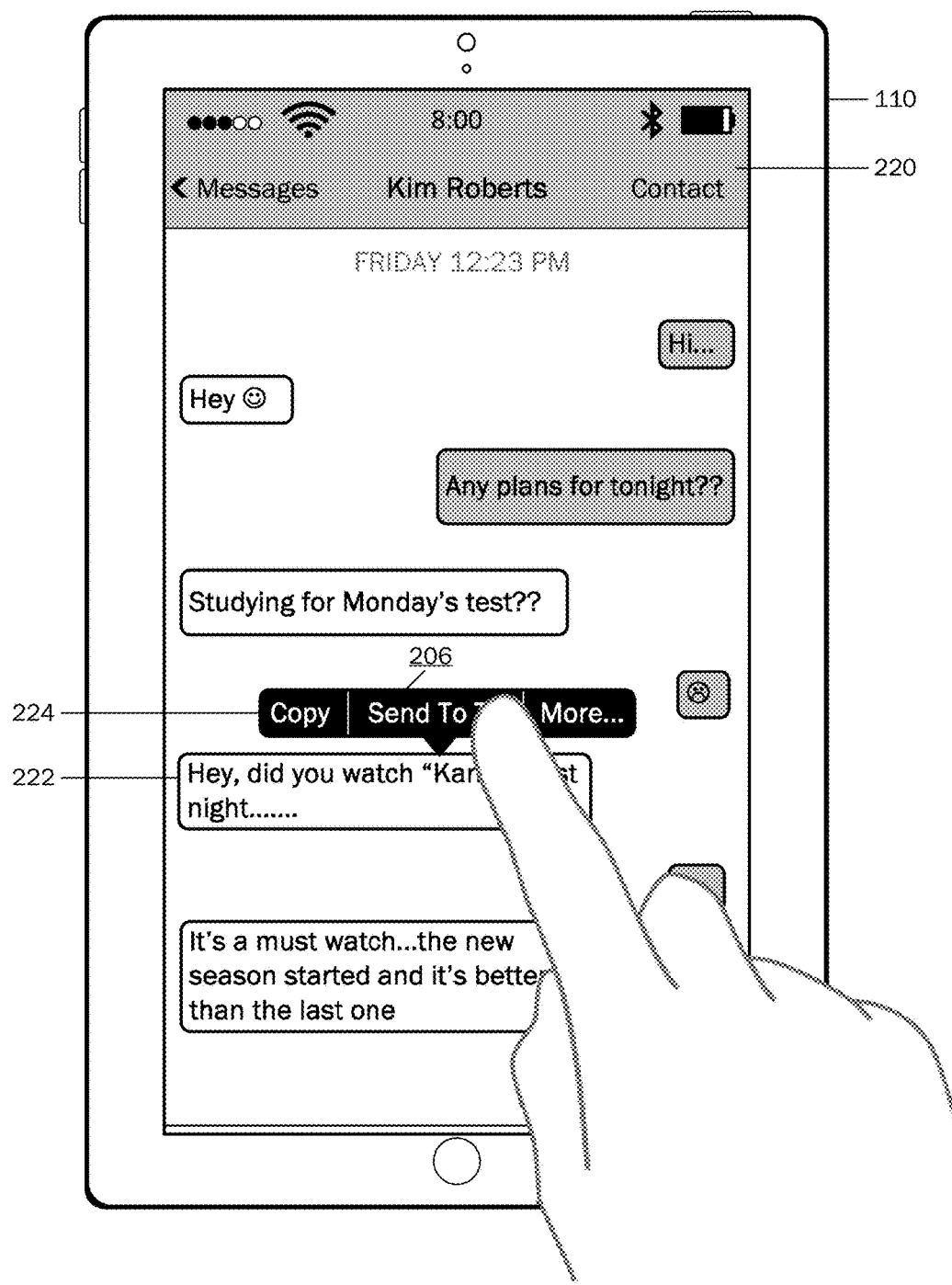
FIG. 2D is an illustration of an example content object UI component integrated with a text messaging application.

As another example and as illustrated in FIG. 2D, a subscriber 102 receives and sends text messages via a text messaging application 220. The subscriber 102 comes across a text message 222 that is of interest to him/her to send to the content identifier matching system 100. For example, the text message 222 comprises a title of a television show that the subscriber 102 is interested in watching. The subscriber 102 is enabled to select the message of interest 222, and a contextual user interface menu 224 comprising the content object UI component 206 is displayed. Accordingly, the subscriber 102 selects the content object UI component 206 to send the message or post 216 to the content identifier matching system 100.

The content object UI components 206 illustrated in FIGS. 2A-2D and described are examples of various content object UI components and how they may be displayed to and selected by a user for sending a content object to the content identifier matching system 100. As should be appreciated, the content object UI components 206 illustrated and described above are for purposes of example only and are not restrictive of other content object UI components that may be provided. In addition, user interaction with the illustrated content object UI components 206 may be accomplished through any suitable means, including touch, voice, keyboard selection, mouse click, gesture, and the like.

Figure 2E:
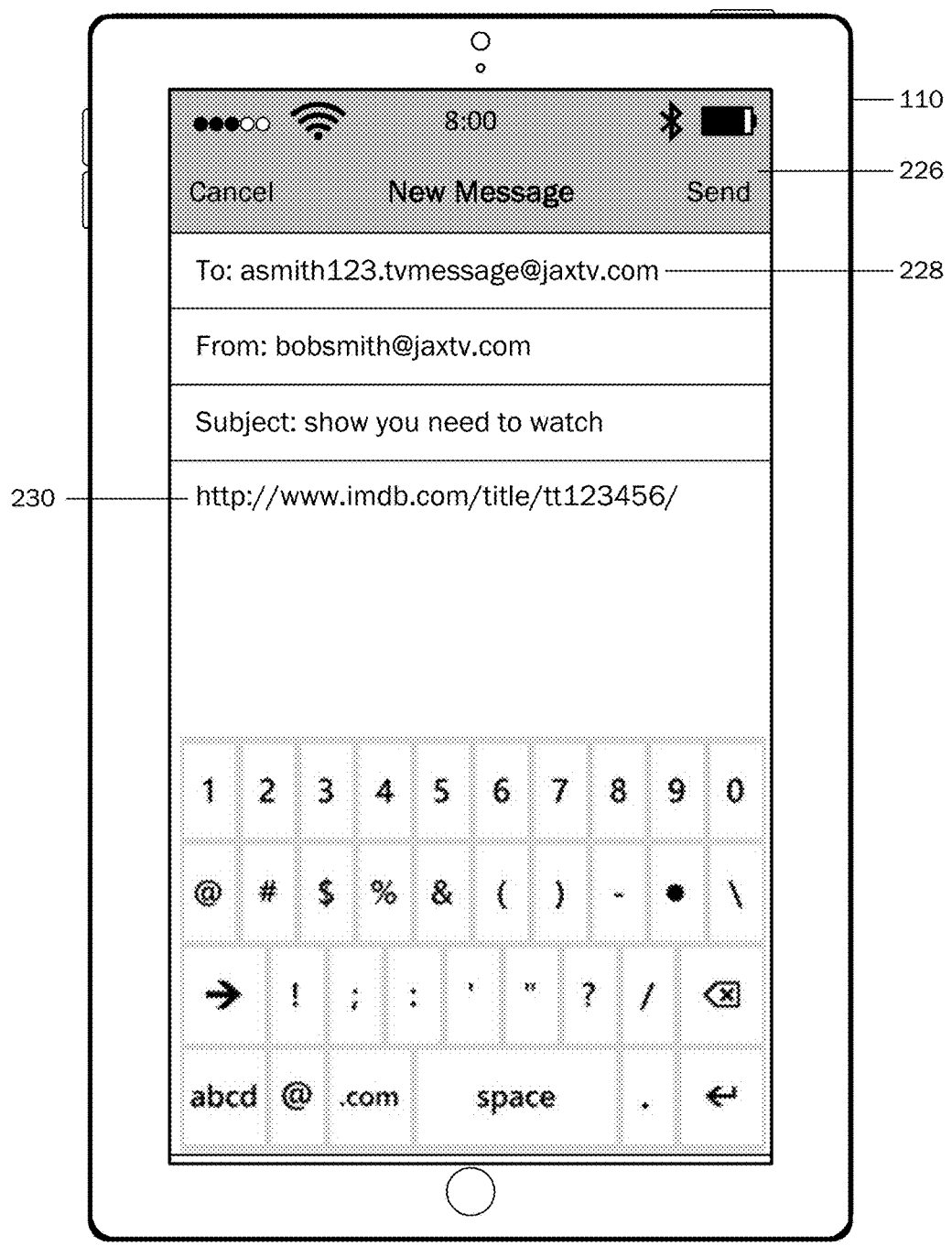
FIG. 2E is an illustration of a user sending an email to the content identifier matching system.

As described above and with reference now to FIG. 2E, a subscriber 102 or another user is enabled to send an electronic message (content object), such as a text message 222, email message 224, instant message, or the like to the content identifier matching system 100 by including a specific identifier 228 as a recipient of the content object, wherein the specific identifier 228 is an address of a mailbox or message inbox associated with a specific video service subscriber 102. For example and as illustrated, a user uses an email application 226 to send an email message 224 to a mailbox or message inbox associated with a subscriber 102. According to an aspect, the mailbox or message inbox is an inbox for receiving messages to the content identifier matching system 100 on behalf of the subscriber 102. The content of the email message 224 may comprise text or an image related to a video content item, such as the title of a television program or a QR code related to a television program, or a link to website comprising text 230 or an image related to a video content item.

Figure 3:
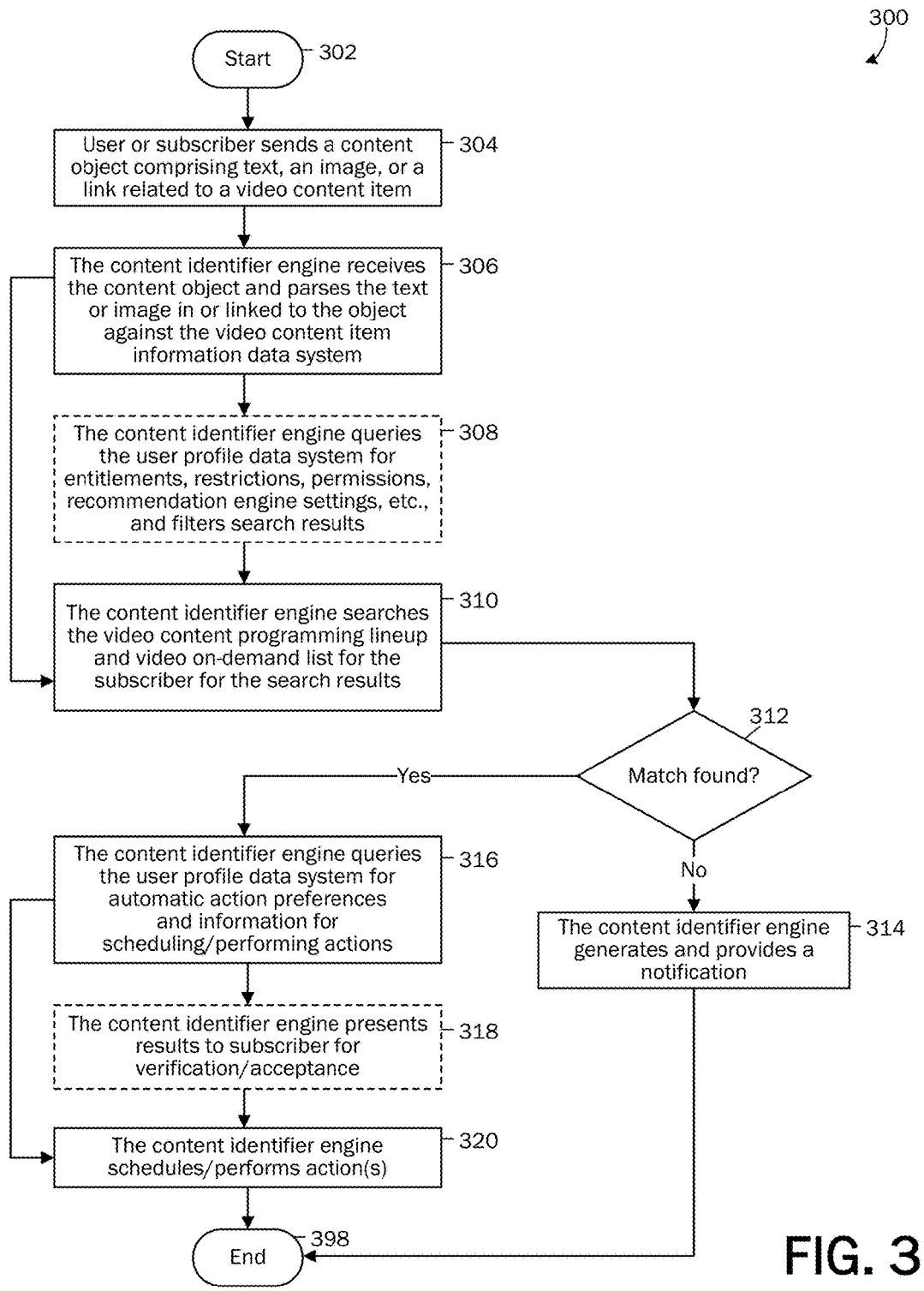
FIG. 3 is a flow chart of a method for automatically performing an action related to a video content item based on an identified relationship between a content object and the video content item.

FIG. 3 is a flow chart of an example method 300 for performing one or more automatic actions related to a video content item based on an identified relationship between a content object and a video content item. The method 300 starts at OPERATION 302 and proceeds to OPERATION 304, where a user or a subscriber 102 sends a content object comprising text, an image, or a link to text or an image related to a video content item. For example, the user or subscriber 102 may view content on a webpage 202, read a social networking service post 216, view an electronic communication, etc. that comprises a content identifier related to a video content item (e.g., a television show, movie, series, etc.). The content identifier includes, without limitation, textual content identifiers (e.g., machine readable text) and visual content identifiers (e.g., machine readable images, QR codes, etc.). For example a textual content identifier may be a title of a video content item, a name of an actor, actress, or character in a video content item, a producer, director, or production crew of a video content item, a quote or a soundtrack song from a video content item, or may include keywords related to a plot summary of a video content item. As another example, a visual content identifier may be a video content poster art image, images of a video content retail packaging, image from a scene of a video content item, image of an actor, character, etc.

As described above, the content object may be one of various types of electronic communication messages, and may be sent via various methods. For example, the content object is an email, text message, instant message, or other electronic communication sent by a user and received by the content identifier engine 106 on behalf of a subscriber 102, or may be sent by the subscriber 102 to the content identifier engine 106. As another example, the content object is a message sent to the content identifier engine 106 upon selection of a content object UI component 206 displayed in a webpage 202 or displayed within a toolbar or menu of a browser application UI 204, a messaging application 220, 226 UI, a social networking application 103 UI, or a third party application. According to an aspect, prior to sending the content object, the user or subscriber 102 is prompted to log in with his/her video service subscriber credentials, or the user is prompted to enter an identifier of a subscriber 102 with whom the user would like to share the content object.

As another example, the content object is a message sent to the content identifier engine 106, for example, via an API, when a social networking service message is sent and/or received by the subscriber 102. According to this example, prior to sending the content object, the subscriber's social networking service 103 account is linked with the video service subscriber account through the social networking service 103, the video service, or through a third party application.

The method 300 proceeds to OPERATION 306, where the content identifier engine 106 receives the content object, parses the content object for content identifiers (e.g., text or images) in or linked to the object, and matches the content identifiers against the video content item information data system 109 for finding a search result of a match or a relationship between the content identifier and a video content item. As described above, the video content item information data system 109 stores information related to video content items, for example, titles, actors, directors, production crew, characters, plot summaries, quotes, soundtrack songs, other keywords, and images.

At optional OPERATION 308, the content identifier engine 106 queries the user profile data system 111 for entitlements, restrictions, permissions, recommendation engine settings, etc., for the subscriber 102, and filters search results according to the subscriber's entitlements, restrictions, permissions, recommendation engine settings, etc.

The method 300 proceeds to OPERATION 310, where the content identifier engine 106 searches the video content programming lineup and video on-demand list for the subscriber 102 for the search results, which may be filtered search results from OPERATION 308. At DECISION OPERATION 312, a determination is made as to whether a match is found between a search result video content item and a video content item available to the subscriber 102 in the video content programming lineup or the video on-demand list.

If a match is not found, the method 300 proceeds to OPERATION 314, where the content identifier engine 106 generates and sends a notification to the user and/or to the subscriber 102 that a video content item matching or related to the content object is not available.

If a match is found, the method 300 proceeds to OPERATION 316, where the content identifier engine 106 queries the user profile data system 111 for automatic action preferences (default or set by the subscriber 102) and information for scheduling/performing actions (e.g., endpoint device identifiers, user entitlements, user restrictions (parental controls), email address, phone number, etc.).

According to an aspect, the method proceeds to optional OPERATION 318, where the content identifier engine 106 presents the matching results to the subscriber 102 for verification/acceptance. For example, the content identifier engine 106 generates a collection of user-selectable links that would allow the subscriber 102 to view or record the video content items matching or related to the content identifiers in or linked to the received content object and that are available to the subscriber 102. According to an aspect, the subscriber 102 is enabled to select on which video content items for the content identifier engine 106 to act (e.g., store in a video storage medium, automatically tune to when they are available/airing, notify the subscriber when they are available/airing, provide recommendations related to the video content items, etc.). According to an aspect, if a video content item requires payment, the content identifier engine 106 receives payment information for or acceptance to purchase or rent the video content item.

According to an aspect, the subscriber 102 is enabled to block a user from sending the subscriber content objects. According to another aspect, the content identifier engine 106 presents video content items matching or related to the received content object but that are not available to the subscriber 102 because of his/her subscription, restrictions, or lack of entitlements. The subscriber 102 is enabled to change his/her subscription, restrictions settings, etc., in order to access the video content items.

The method 300 proceeds from OPERATION 316 or OPERATION 318 to OPERATION 320, where the content identifier engine 106 schedules/performs the action(s) according to the automatic action preferences (default or set by the subscriber 102). For example, the content identifier engine 106 performs or allocate resources to complete a request to perform one or more of: generating a collection of user-selectable links that would allow the subscriber 102 to view or record the video content item; storing a copy of the video content item in a video storage medium of the DVR 107A,B accessible to the subscriber; providing recommendations of similar video content items, tuning to the video content item when it is airing, and generating and sending a notification informing the subscriber 102 of when the specific video content item is airing. The method 300 ends at OPERATION 398.

Figure 4:
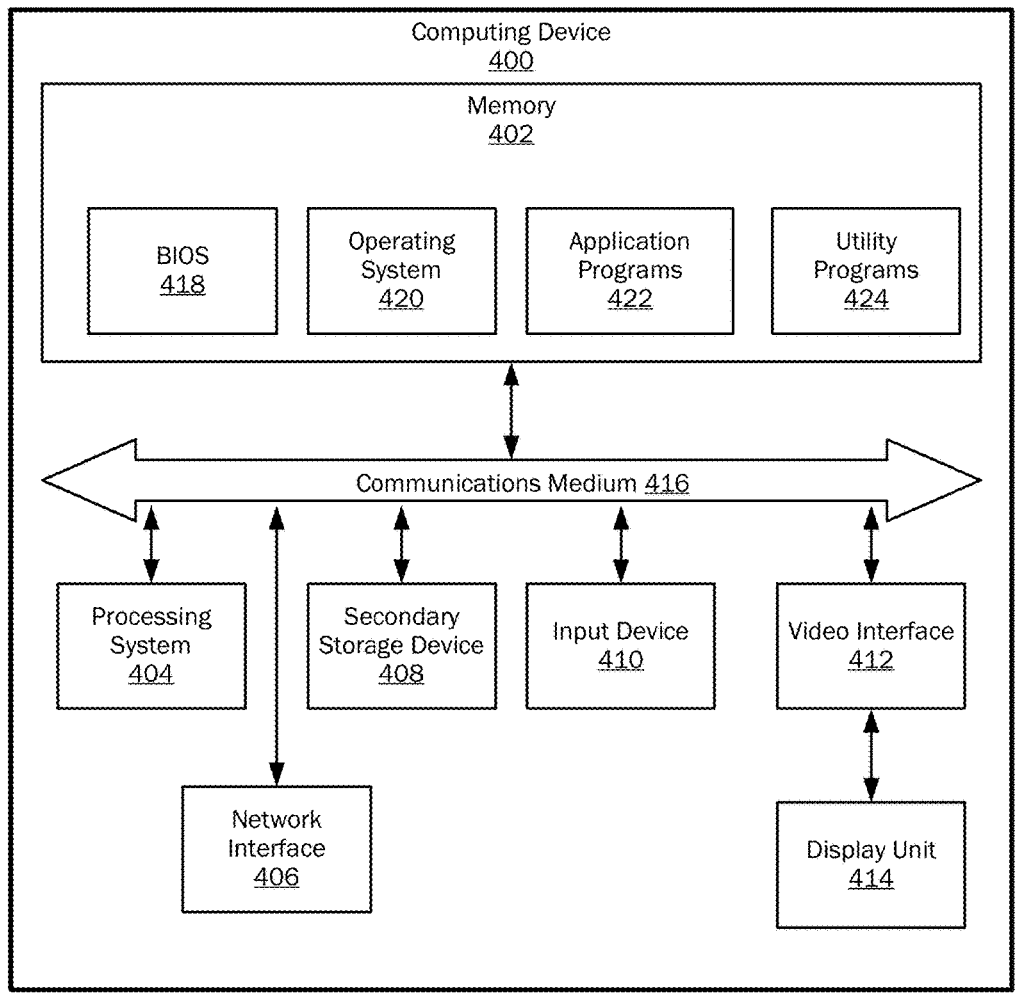
FIG. 4 is a block diagram illustrating example physical components of a computing device with which aspects may be practiced.

FIG. 4 is a block diagram illustrating example physical components of a computing device 400 with which embodiments may be practiced. In some embodiments, one or a combination of the components of the content identifier matching system 100 may be implemented using one or more computing devices like the computing device 400. It should be appreciated that in other embodiments, one or a combination of the components of the content identifier matching system 100 may be implemented using computing devices having hardware components other than those illustrated in the example of FIG. 4.

Computing devices may be implemented in different ways in different embodiments. For instance, in the example of FIG. 4, the computing device includes a processing system 404, memory device 402, a network interface 406, a secondary storage device 408, an input device 410, a video interface 412, and a display unit 414. In other embodiments, the computing device 400 may be implemented using more or fewer hardware components (e.g., without a video interface, or with multiple input devices) or in combination with other types of computer systems and program modules. The memory device 402 includes one or more computer-readable storage device capable of storing data or computer-executable instructions. Memory device 402 thus may store the computer-executable instructions that, when executed by processing system 404, provide integration of content functionality with social network accounts, as described above with reference to FIGS. 1-3.

In various embodiments, the memory device 402 is implemented in various ways. For example, the memory device 402 can be implemented as various types of computer-readable storage devices. Example types of computer-readable storage devices include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices or articles of manufacture that store data.

According to embodiments, the term computer-readable media includes communication media and computer-readable storage devices. Communication media includes information delivery media. Computer-executable instructions, data structures, program modules may be embodied on a communications medium. For example, communication media can include wired media, such as a wired network or direct-wired connection, and wireless media, such as acoustic, radio frequency (RF), infrared, and other wireless media.

The term computer-readable storage device refers only to devices and articles of manufacture that store data or computer-executable instructions readable by a computing device. Computer-readable storage device does not include communications media. The term computer-readable storage device encompasses volatile and nonvolatile and removable and non-removable media implemented in various methods or technologies for storage and retrieval of information. Such information can include data structures, program modules, computer-executable instructions, or other data.

The processing system 404 includes one or more processing units, which may include tangible integrated circuits that selectively execute computer-executable instructions. In various embodiments, the processing units in the processing system 404 are implemented in various ways. For example, the processing units in the processing system 404 can be implemented as one or more processing cores. In this example, the processing system 404 can comprise one or more Intel Core microprocessors. In another example, the processing system 404 can comprise one or more separate microprocessors. In yet another example embodiment, the processing system 404 can comprise Application-Specific Integrated Circuits (ASICs) that provide specific functionality. In yet another example, the processing system 404 provides specific functionality by using an ASIC and by executing computer-executable instructions.

The computing device 400 may be enabled to send data to and receive data from a communication network via a network interface 406. In different embodiments, the network interface 406 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer devices that execute communication applications, storage servers, and comparable devices.

The secondary storage device 408 includes one or more computer-readable storage devices, and may store data and computer-executable instructions not directly accessible by the processing system 404. That is, the processing system 404 performs an I/O operation to retrieve data or computer-executable instructions from the secondary storage device 408. In various embodiments, the secondary storage device 408 can be implemented as various types of computer-readable storage devices, such as by one or more magnetic disks, magnetic tape drives, CD-ROM discs, DVD-ROM discs, BLU-RAY discs, solid state memory devices, or other types of computer-readable storage devices.

The input device 410 enables the computing device 400 to receive input from a user. Example types of input devices include, but are not limited to, keyboards, mice, trackballs, stylus input devices, key pads, microphones, joysticks, touch-sensitive display screens, and other types of devices that provide user input to the computing device 400.

The video interface 412 outputs video information to the display unit 414. In different embodiments, the video interface 412 is implemented in different ways. For example, the video interface 412 may be a video expansion card. In another example, the video interface 412 is integrated into a motherboard of the computing device 400. In various embodiments, the display unit 414 can be a an LCD display panel, a touch-sensitive display panel, an LED screen, a projector, a cathode-ray tube display, or another type of display unit. In various embodiments, the video interface 412 communicates with the display unit 414 in various ways. For example, the video interface 412 can communicate with the display unit 414 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 416 facilitates communication among the hardware components of the computing device 400. In different embodiments, the communications medium 416 facilitates communication among different components of the computing device 400. For instance, in the example of FIG. 4, the communications medium 416 facilitates communication among the memory device 402, the processing system 404, the network interface 406, the secondary storage device 408, the input device 410, and the video interface 412. In different embodiments, the communications medium 416 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory device 402 stores various types of data or software instructions. For instance, in the example of FIG. 4, the memory device 402 stores a Basic Input/Output System (BIOS) 418, and an operating system 420. The BIOS 418 includes a set of software instructions that, when executed by the processing system 404, cause the computing device 400 to boot up. The operating system 420 includes a set of software instructions that, when executed by the processing system 404, cause the computing device 400 to provide an operating system that coordinates the activities and sharing of resources of the computing device 400. The memory device 402 also stores one or more application programs 422 that, when executed by the processing system 404, cause the computing device 400 to provide applications to users. The memory device 402 also stores one or more utility programs 424 that, when executed by the processing system 404, cause the computing device 400 to provide utilities to other software programs. Embodiments of the present invention may be used in various distributed computing environments where tasks are performed by remote processing devices that are linked through a communications network in a distributed computing environment.

Figures 5A, 5B:
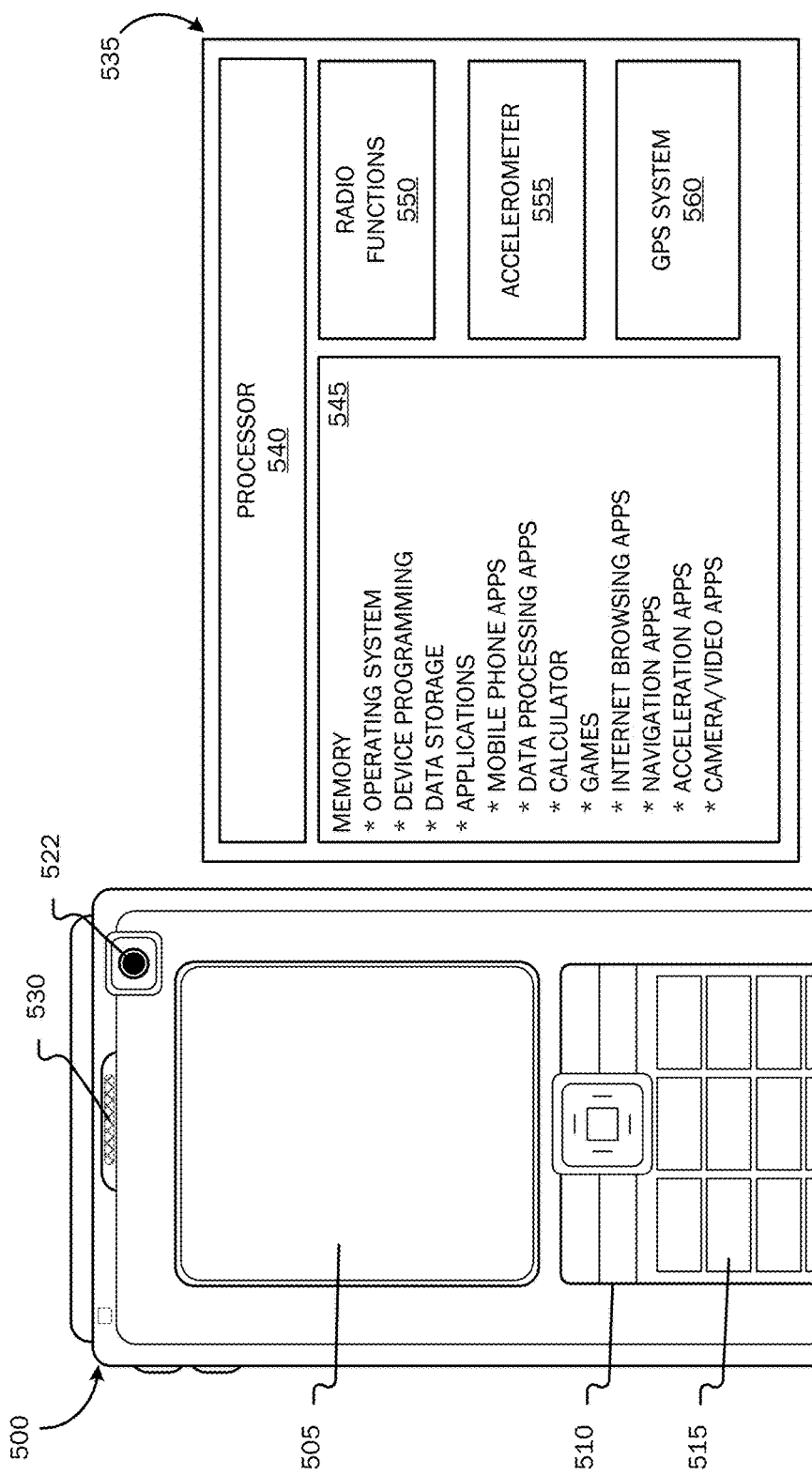
FIGS. 5A-5B illustrate a suitable mobile computing environment with which aspects may be practiced.

FIGS. 5A-5B illustrate a suitable mobile computing environment, for example, a mobile computing device 500, a mobile phone/smartphone, a tablet device, a laptop computer, and the like, with which embodiments may be practiced. The mobile computing device 500 is illustrative of any suitable device operative to send, receive and process wireless communications according to embodiments of the present invention. A display screen 505 is operative for displaying a variety of information such as information about incoming and outgoing communications, as well as, a variety of data and displayable objects, for example, text, alphanumeric data, photographs, and the like.

Data input to the mobile computing device 500 may be performed via a variety of suitable means, such as, touch screen input via the display screen 505, keyboard or keypad input via a data entry area 510, key input via one or more selectable buttons or controls 515, voice input via a microphone 518 disposed on the mobile computing device 500, photographic input via a camera 522 functionality associated with the mobile computing device 500, or any other suitable input means. Data may be output via the mobile computing device 500 via any suitable output means, including but not limited to, display on the display screen 505, audible output via an associated speaker 530 or connected earphone system, vibration module for providing haptic output, and the like.

Referring now to FIG. 5B, operational unit 535 is illustrative of internal operating functionality of the mobile computing device 500. A processor 540 is illustrative of a general purpose computer processor for processing incoming and outgoing data and communications and controlling operation of the device and associated software applications via a mobile computing device operating system. Memory device 545 may be used for storing a device operating system, device programming, one or more stored applications, for example, mobile telephone applications, data processing applications, calculators, games, Internet browsing applications, navigation applications, acceleration applications, camera or video applications, etc. According to one embodiment, application software to analyze trending content items from the user's associated social network(s) and identify user interface modules is stored locally on mobile computing device 500.

Mobile computing device 500 may contain an accelerometer 555 for detecting acceleration, and can be used to sense orientation, vibration, and/or shock, etc. Mobile computing device 500 may contain a global positioning system (GPS) system (e.g., GPS send/receive functionality) 560. A GPS system 560 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 550 include all required functionality, including onboard antennas, for allowing the mobile computing device 500 to communicate with other communication devices and systems via a wireless network. Radio functions 550 may be used to communicate with a wireless or Wi-Fi based positioning system to determine a device's 500 location.

FIG. 6 is a simplified block diagram illustrating a cable television services system 600 (hereafter referred to as "CATV") architecture providing an operating environment according to an embodiment. As can be appreciated, a CATV architecture is but one of various types of systems that may be used to provide content object matching. Referring now to FIG. 6, digital and analog video programming, information content and interactive television services are provided via a hybrid fiber coax (HFC) network 655 to a television set 616 for consumption by a cable television/services system customer. As is known to those skilled in the art, HFC networks 655 combine both optical fiber and coaxial cable lines. Typically, optical fiber runs from the cable head end 650 to neighborhoods of subscribers. Coaxial cable runs from the optical fiber feeders to each customer or subscriber. The functionality of the HFC network 655 allows for efficient bidirectional data flow between the client-side set-top box 618 and a server-side application server 640.

The CATV system 600 is in the form of a distributed client-server computing system for providing video and data flow across the HFC network 655 between server-side services providers (e.g., cable television/services providers) via a server-side head end 650 and a client-side customer via a client-side set-top box (STB) 618 in communication with a customer receiving device, such as the television set 616. As is understood by those skilled in the art, modern CATV systems 600 may provide a variety of services across the HFC network 655 including traditional digital and analog video programming, telephone services, high speed Internet access, video-on-demand, and information services.

On the client side of the CATV system 600, digital and analog video programming and digital and analog data are provided to the customer television set 616 via the set-top box (STB) 618. Interactive television services that allow a customer to input data to the CATV system 600 likewise are provided by the STB 618. As illustrated in FIG. 6, the STB 618 is a multipurpose computing device having a computer processor, memory, and an input/output mechanism. The input/output mechanism receives input from server-side processes via the HFC network 655 and from customers via input devices such as the remote control device 628, keyboard 630, or other computing device, such as a tablet/slate computer, mobile computing device 500, etc. The remote control device 628 and the keyboard 630 may communicate with the STB 618 via a suitable communication transport such as the infrared connection 632. The STB 618 also includes a video processor for processing and providing digital and analog video signaling to the television set 616 via a cable communication transport 634. A multi-channel tuner is provided for processing video and data to and from the STB 618 and the server-side head end system 650, described below.

The STB 618 also includes an operating system 622 for directing the functions of the STB 618 in conjunction with a variety of client applications 625. For example, if a client application 625 requires a news flash from a third-party news source to be displayed on the television set 616, the operating system 622 may cause the graphics functionality and video processor of the STB 618, for example, to output the news flash to the television set 616 at the direction of the client application 625 responsible for displaying news items.

Because a variety of different operating systems 622 may be used by a variety of different brands and types of set-top boxes, a middleware layer 624 may be provided to allow a given software application to be executed by a variety of different operating systems 622. According to an embodiment, the middleware layer 624 may include a set of application programming interfaces (APIs) that are exposed to client applications 625 and operating systems 622 that allow the client applications to communicate with the operating systems through common data calls understood via the API set. As described below, a corresponding middleware layer 624 is included on the server side of the CATV system 600 for facilitating communication between the server-side application server 640 and the client-side STB 618. The middleware layer 642 of the server-side application server 640 and the middleware layer 624 of the client-side STB 618 may format data passed between the client side and server side according to the Extensible Markup Language (XML).

According to one embodiment, the STB 618 passes digital and analog video and data signaling to the television set 616 via a one-way communication transport 634. According to other embodiments, two-way communication transports may be used, for example, via high definition multimedia (HDMI) ports. The STB 618 may receive video and data from the server side of the CATV system 600 via the HFC network 655 through a video/data downlink and data via a data downlink. The STB 618 may transmit data from the client side of the CATV system 600 to the server side of the CATV system 600 via the HFC network 655 via one data uplink. The video/data downlink is an "in band" downlink that allows for digital and analog video and data signaling from the server side of the CATV system 600 through the HFC network 655 to the STB 618 for use by the STB 618 and for distribution to the television set 616. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 6, between the HFC network 655 and the STB 618 comprise "out of band" data links. As is understand by those skilled in the art, the "out of band" frequency range is generally at a lower frequency than "in band" signaling. For example, the "out of band" frequency range may be between 0 and 54 megahertz. Data flow between the client-side STB 618 and the server-side application server 640 is typically passed through the "out of band" data links. Alternatively, an "in band" data carousel may be positioned in an "in band" channel into which a data feed may be processed from the server-side application server 640 through the HFC network 655 to the client-side STB 618. Operation of data transport between components of the CATV system 600, described with reference to FIG. 6, is well known to those skilled in the art.

Referring still to FIG. 6, the head end 650 of the CATV system 600 is positioned on the server side of the CATV system 600 and includes hardware and software systems responsible for originating and managing content for distributing through the HFC network 655 to client-side STBs 618 for presentation to customers via television sets 616. As described above, a number of services may be provided by the CATV system 600, including digital and analog video programming, interactive television services, telephone services, video-on-demand services, targeted advertising, and provision of information content.

The application server 640 is a general-purpose computing system operative to assemble and manage data sent to and received from the client-side STB 618 via the HFC network 655. As described above with reference to the STB 618, the application server 640 includes a middleware layer 642 for processing and preparing data from the head end of the CATV system 600 for receipt and use by the client-side STB 618. For example, the application server 640 via the middleware layer 642 may obtain data from third-party services 646 via the Internet 641 for transmitting to a customer through the HFC network 655 and the STB 618. For example, content metadata of a third-party content provider service may be downloaded by the application server 640 via the Internet 641. When the application server 640 receives the downloaded content metadata, the middleware layer 642 may be used to format the content metadata for receipt and use by the STB 618. Therefore, content metadata may be sent and categorized based on the availability to the customer's program guide data.

According to one embodiment, data obtained and managed by the middleware layer 642 of the application server 640 is formatted according to the Extensible Markup Language and is passed to the STB 618 through the HFC network 655 where the XML-formatted data may be used by a client application 625 in concert with the middleware layer 624, as described above. As should be appreciated by those skilled in the art, a variety of third-party services data, including news data, weather data, sports data and other information content may be obtained by the application server 640 via distributed computing environments such as the Internet 641 for provision to customers via the HFC network 655 and the STB 618.

According to various embodiments, the application server 640 obtains customer support services data, including billing data, information on customer work order status, answers to frequently asked questions, services provider contact information, and the like from data services 660 for provision to the customer via an interactive television session. As illustrated in FIG. 6, the services provider data services 660 include a number of services operated by the services provider of the CATV system 600, which may include data on a given customer.

A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

An email system 664 may include information such as user accounts, address books, archived messages, subscriber profiles, subscribers IDs, and passwords used by customers for access to electronic mail services.

An authentication system 666 may include information such as secure user names, subscriber profiles, subscriber IDs, and passwords used by customers for access to network services.

A customer information database 668 may include general information about customers such as place of employment, business address, business telephone number, and demographic information such as age, gender, educational level, and the like. The customer information database 668 may also include information on pending work orders for services or products ordered by the customer. The customer information database 668 may also include general customer information such as answers to frequently asked customer questions and contact information for various service provider offices/departments. As should be understood, this information may be stored in a variety of disparate databases operated by the cable services provider.

As should be understood by those skilled in the art, the disparate systems 662, 664, 665, 668 may be integrated or provided in any combination of separate systems, wherein FIG. 6 shows only one example.

Referring still to FIG. 6, web services system 670 is illustrated between the application server 640 and the data services 660. According to embodiments, web services system 670 serves as a collection point for data requested from each of the disparate data services systems comprising the data services 660. According to embodiments, when the application server 640 requires customer services data from one or more of the data services 660, the application server 640 passes a data query to the web services system 670. The web services system 670 formulates a data query to each of the available data services systems 660 for obtaining any required data for a requesting customer as identified by a set-top box identification associated with the customer. The web services system 670 serves as an abstraction layer between the various data services systems 660 and the application server 640. That is, the application server 640 is not required to communicate with the disparate data services systems 660, nor is the application server 640 required to understand the data structures or data types used by the disparate data services systems 660. The web services system 670 is operative to communicate with each of the disparate data services systems 660 for obtaining necessary customer data. The customer data obtained by the web services system 650 is assembled and is returned to the application server 640 for ultimate processing via the middleware layer 642, as described above.

Embodiments of the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be used in various distributed computing environments where tasks are performed by remote processing devices that are linked through a communications network in a distributed computing environment, and where programs may be located in both local and remote memory storage.

Embodiments, for example, are described above with reference to block diagrams or operational illustrations of methods, systems, and computer program products according to embodiments. The functions/acts noted in the blocks may occur out of the order as shown in any flowchart or described herein with reference to FIGS. 1-6. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage media and devices, data may also be stored on or read from other types of computer-readable storage devices, such as secondary storage devices, like hard disks, floppy disks, a CD-ROM, or other forms of RAM or ROM. Further, the disclosed processes may be modified in any manner, including by reordering, inserting, or deleting a step or process, without departing from the embodiments.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
providing a first selectable content object user interface (UI) with a display of a webpage;
providing a second selectable content object UI when a portion of text is highlighted on the webpage, each selectable content object UI to communicate a content object including communicating highlighted text on the webpage via the second selectable content object UI and communicating a link to the webpage via the first selectable content object UI or communicating displayed content of the webpage via the first selectable content object UI;
receiving, via the first or the second selectable content object UI, the content object associated with a subscriber for searching for information related to a video content item;
parsing the content object for one or more keywords to use in a search against a database of video content item information;
identifying the video content item in the database of video content item information with information matching or related to the one or more keywords parsed from the content object;
searching on demand content items and a video programming lineup available to the subscriber for an identified video content item;
identifying a match between the identified video content item and a video content item available to the subscriber;
automatically performing or scheduling an action associated with the video content item available to the subscriber within a video provider system;
identifying one or more recommended video content items similar to the video content item available to the subscriber; and
providing the one or more recommended video content items similar to the video content item available to the subscriber.

2. The method of claim 1, wherein receiving the content object associated with the subscriber comprises receiving at least one of:
a text message;
an email;
an instant message;
a social networking application post; and
an electronic communication created in response to receiving an indication of a selection of a content object UI component.

3. The method of claim 1, further comprising:
displaying a third selectable content object UI upon selecting a text message via a handheld computing device; and
using the third selectable content object UI to send the text message as a content object to a content identifier matching system to identify a relevant video content item and perform an automatic action for the relevant video content item associated with the content object.

4. The method of claim 1, wherein the parsing of the content object comprises at least one textual content identifier or a visual content identifier selected from:
titles of video content items;
plot summaries of video content items;
actors in video content items;
directors of video content items;
producers of video content items;
characters in video content items;
quotes in video content items;
soundtrack songs of video content items;
keywords;
images of video content poster art;
images of video content retail packaging;
images of actors in video content items;
images of characters in video content items; and
images from scenes of video content items.

5. The method of claim 1, wherein the searching comprises searching the on demand content items and the video programming lineup available to the subscriber based on at least one of:
a video service subscription;
a geographic location;
permissions associated with a video service account; and
restrictions associated with the video service account.

6. The method of claim 1, wherein the automatically performing or scheduling the action within the video provider system-comprises:
storing a copy of the video content item to a video storage medium of a digital video recorder associated with the subscriber;
generating a notification informing the subscriber of when the video content item is airing or available;
determining which search results are likely candidates as the one or more recommended video content items for the subscriber; and
providing the one or more recommended video content items as the likely candidates similar to the video content item.

7. The method of claim 6, further comprising receiving user preference selections of actions for a video service provider to perform when the match between the identified video content item and the video content item available to the subscriber is identified.

8. The method of claim 1, wherein prior to the automatically performing or scheduling the action associated with the video content item available to the subscriber within the video provider system, presenting the available video content item to the subscriber for acceptance.

9. The method of claim 8, wherein if the available video content item requires payment, receiving payment for rental or purchase of the available video content item.

10. A system comprising: a video content item matching or related to text or an image obtained from a content object;
a video content item information data system operable to store information related to the video content item;
a user profile data system operable to store: a subscriber identifier; action preferences; and
a content lineup identifier available to the subscriber;
a video content item data system operable to store programming lineups and a listing of available video on demand content items;
a webpage;
a first selectable content object user interface (UI) displayed with the webpage;
a second selectable content object UI enabled when a portion of text is highlighted on the webpage, each selectable content object UI to communicate the content object including communicating highlighted text on the webpage via the second selectable content object UI and communicating a link to the webpage via the first selectable content object UI or communicating displayed content of the webpage via the first selectable content object UI; and a content identifier engine operable to:
  receive, via the first or the second selectable content object UI, the content object associated with the subscriber for searching for information related to the video content item;
  parse the text or image, including the highlighted text, in the content object for one or more keywords to use in a search against the video content item information data system;
  identify the video content item in the video content item information data system with information matching or related to the one or more keywords parsed from the content object;
  search the video content item data system for an identified video content item;
  identify a match between the identified video content item and a video content item available to the subscriber;
  automatically perform or schedule an action associated with the video content item available to the subscriber within a video provider system;
  identify one or more recommended video content items similar to the video content item available to the subscriber and
  provide the one or more recommended video content items similar to the video content item available to the subscriber.

11. The system of claim 10, wherein the content identifier engine is operable to receive at least one of:
  a text message;
  an email;
  an instant message;
  a social networking application post; and
  an electronic communication created in response to receiving an indication of a selection of a content object UI component, wherein the content object UI component is provided by an extension installed on the subscriber's endpoint device as a plug-in to a text messaging, an emailing, an instant messaging, or a social networking application.

12. The system of claim 10, wherein the video content item information data system is operable to store at least one of:
  a title of the video content item;
  a plot summary of the video content item;
  actors in the video content item;
  a director of the video content item;
  a producer of the video content item;
  characters in the video content item;
  quotes in the video content item;
  soundtrack songs of the video content item;
  keywords;
  images of video content poster art;
  images of video content retail packaging;
  images of actors in video content items;
  images of characters in video content items; and
  images from scenes of video content items.

13. The system of claim 10, wherein the content identifier engine is further operable to search on demand content items and a video programming lineup available to the subscriber based on at least one of:
  a video service subscription;
  a geographic location;
  permissions associated with a video service account; and
  restrictions associated with the video service account.

14. The system of claim 10, wherein the content identifier engine is operable to perform or to allocate resources to:
  store a copy of the video content item to a video storage medium of a digital video recorder associated with the subscriber;
  generate a notification informing the subscriber of when the video content item is airing or available; and
  provide the one or more recommended video content items similar to the video content item.

15. The system of claim 14, wherein prior to the automatically perform or schedule the action associated with the video content item available to the subscriber within the video provider system, the content identifier engine is further operable to query the user profile data system for action preferences selected by the subscriber.

16. The system of claim 10, wherein prior to the automatically perform or schedule the action associated with the video content item available to the subscriber within the video provider system, the content identifier engine is further operable to present the available video content item to the subscriber for acceptance or payment if required.

17. A computer-readable storage device containing computer executable instructions which, when executed by a computer, perform a method-comprising:
  providing a first selectable content object user interface (UI) with a display of a webpage;
  providing a second selectable content object UI when a portion of text is highlighted on the webpage, each selectable content object UI to communicate a content object including communicating highlighted text on the webpage via the second selectable content object UI and communicating a link to the webpage via the first selectable content object UI or communicating displayed content of the webpage via the first selectable content object UI;
  receiving, via the first or the second selectable content object UI, the content object associated with a subscriber for searching for information related to a video content item;
  parsing the content object for one or more keywords to use in a search against a database of video content item information;
  identifying the video content item in the database of video content item information with information matching or related to the one or more keywords parsed from the content object;
  searching on demand content items and a video programming lineup available to the subscriber for an identified video content item;
  identifying a match between the identified video content item and a video content item available to the subscriber; and
  automatically performing or scheduling an action associated with the video content item available to the subscriber within a video provider system, wherein the automatically performing or scheduling the action associated with the video content item available to the subscriber within the video provider system comprises:
  storing a copy of the video content item to a video storage medium of a digital video recorder associated with the subscriber;
  generating a notification informing the subscriber of when the video content item is airing or available;
  identifying one or more recommended video content items similar to the video content item available to the subscriber; and
  providing the one or more recommended video content items similar to the video content item available to the subscriber.

18. The computer-readable storage device of claim 17, wherein receiving the content object associated with the subscriber comprises receiving at least one of:
- a text message;
- an email;
- an instant message;
- a social networking application post; and
- an electronic communication created in response to receiving an indication of a selection of a content object UI component, wherein the content object UI component is provided by an extension installed on the subscriber's endpoint device as a plug-in to a text messaging, an emailing, an instant messaging, or a social networking application.

19. The computer-readable storage device of claim 17, wherein the parsing of the content object comprises at least one textual content identifier or a visual content identifier selected from:
- titles of video content items;
- plot summaries of video content items;
- actors in video content items;
- directors of video content items;
- producers of video content items;
- characters in video content items;
- quotes in video content items;
- soundtrack songs of video content items; keywords;
- images of video content poster art;
- images of video content retail packaging;
- images of actors in video content items;
- images of characters in video content items; and
- images from scenes of video content items.

20. The computer-readable storage device of claim 17, further comprising receiving user preference selections of actions for a video service provider to perform when the match between the identified video content item and the video content item available to the subscriber is identified.

* * * * *